United States Patent
Renck et al.

(10) Patent No.: US 6,815,022 B2
(45) Date of Patent: Nov. 9, 2004

(54) LAMINATED STRUCTURES CONSTRUCTED FROM ADHESIVELY JOINED SHEET MATERIAL LAYERS

(75) Inventors: Lawrence E. Renck, Hartsville, SC (US); Stéphane Demare, Brussels (BE)

(73) Assignee: Sonoco Development, Inc., Hartsville, SC (US)

( * ) Notice: Subject to any disclaimer, the term of this patent is extended or adjusted under 35 U.S.C. 154(b) by 2 days.

(21) Appl. No.: 10/174,916

(22) Filed: Jun. 18, 2002

(65) Prior Publication Data

US 2003/0232162 A1 Dec. 18, 2003

(51) Int. Cl.[7] .............................. B32B 1/08; B32B 3/10; B32B 3/12; B32B 29/00; B31C 3/00
(52) U.S. Cl. .................. 428/34.3; 428/34.2; 428/36.9; 428/36.91; 428/116; 428/117; 428/131; 428/137; 428/138; 428/139; 428/140; 428/537.5; 428/906; 138/141; 138/144; 162/147; 493/128; 493/299; 493/906; 493/933; 493/966
(58) Field of Search ............................... 428/34.2, 34.3, 428/36.91, 36.9, 131, 137, 138, 139, 140, 116, 117, 537.5, 906; 138/141, 144; 493/128, 299, 906, 933, 966; 162/147

(56) References Cited

U.S. PATENT DOCUMENTS

| | | | |
|---|---|---|---|
| 1,145,415 A | | 7/1915 | Herr |
| 1,274,323 A | * | 7/1918 | Poetschke .................. 428/140 |
| 3,113,435 A | * | 12/1963 | Yount ........................ 405/270 |
| 3,813,026 A | * | 5/1974 | Biancamaria ............... 229/4.5 |
| 4,150,186 A | * | 4/1979 | Kazama ...................... 428/140 |
| 4,282,276 A | | 8/1981 | Smith |
| 4,297,402 A | | 10/1981 | Kinbara et al. |
| 4,421,811 A | * | 12/1983 | Rose et al. ................. 428/116 |
| 4,587,175 A | * | 5/1986 | Akao .......................... 428/596 |
| 4,687,692 A | * | 8/1987 | Akao .......................... 428/137 |
| 4,788,088 A | | 11/1988 | Kohl |
| 4,803,111 A | * | 2/1989 | Mansell ...................... 428/139 |
| 4,954,383 A | * | 9/1990 | King et al. ................. 428/131 |
| 5,167,994 A | * | 12/1992 | Paulson ...................... 428/34.2 |
| 5,393,582 A | * | 2/1995 | Wang et al. ................ 428/34.2 |
| 5,405,663 A | | 4/1995 | Archibald et al. |
| 5,407,714 A | | 4/1995 | Laves |
| 5,446,250 A | * | 8/1995 | Oka ............................ 181/208 |
| 5,505,395 A | * | 4/1996 | Qiu et al. ................. 242/118.32 |
| 5,620,768 A | * | 4/1997 | Hoffmann, Sr. ............. 428/77 |
| 5,985,457 A | * | 11/1999 | Clifford ..................... 428/416 |
| 6,171,680 B1 | * | 1/2001 | Fahmy ....................... 428/138 |
| 6,546,694 B2 | * | 4/2003 | Clifford ..................... 52/791.1 |

FOREIGN PATENT DOCUMENTS

| | | |
|---|---|---|
| EP | 0 628 408 A1 | 12/1994 |
| EP | 1 134 091 A1 | 9/2001 |

OTHER PUBLICATIONS

European Search Report; EP Application No. 03101398.0, Filed May 19, 2003; Date of Completion Dec. 12, 2003; Date Mailed Jan. 2, 2004.

* cited by examiner

*Primary Examiner*—Harold Pyon
*Assistant Examiner*—Chris Bruenjes
(74) *Attorney, Agent, or Firm*—Alston & Bird LLP

(57) ABSTRACT

One or more sheet material layers in a multi-layer laminated structure is reinforced by adhesive bridges that extend through openings in the layer and tie together the layers on either side of the reinforced layer. A plurality of openings are provided in the layer or layers to be reinforced. The openings are spaced apart and distributed over the surface of the layer. Accordingly, when the layer is incorporated into a multi-layer structure, the adhesive applied to the layer, or to the layers on either side thereof, is forced through the openings so that a continuous adhesive connection is formed between the layers on opposite sides of the reinforced layer via the adhesive bridges that extend through the openings.

8 Claims, 4 Drawing Sheets

US 6,815,022 B2

LAMINATED STRUCTURES CONSTRUCTED FROM ADHESIVELY JOINED SHEET MATERIAL LAYERS

FIELD OF THE INVENTION

The present invention relates to structures made from multiple layers of sheet material adhered together. The invention relates more particularly to such structures in which the various layers are of dissimilar materials or have different strength properties.

BACKGROUND OF THE INVENTION

A variety of products are constructed from multiple layers of sheet material joined together by adhesive, referred to herein as laminated structures. Laminated structures can be formed of many different types of rigid or flexible sheet materials. The motivation for making a structure as a laminated structure, as opposed to using a single layer of equivalent thickness, can vary depending on the particular application. For instance, in the case of a laminated wood structure such as plywood, the direction in which the grain runs in the various layers can be alternated between 0° and 90° directions so that the resulting plywood has similar bending strength in both directions. In contrast, a single wood layer of the same type and thickness would have a significantly lower bending strength in one direction than the other because of the effect of the grain.

In other cases, multiple layers are used because the particular material of which the structure is to be made is available only in sheets whose thickness is substantially smaller than the needed thickness of the structure. For instance, many types of paperboard structures are formed as laminated structures because paperboard generally is not available in thicknesses greater than about one millimeter, whereas the structure to be formed may have to have a thickness of several millimeters or more to meet strength and/or dimensional requirements. As an example, paperboard tubes are manufactured for various uses, including as containers for products, as cores for winding paper, film, and textiles, as concrete forms, as structural members, and others. In many of these types of tubes, dimensional and/or strength requirements dictate that from three to as many as 25 or more layers of paperboard must be used to build the tube. A paperboard tube typically is made by sequentially wrapping a plurality of paperboard plies about a mandrel having the desired shape of the tube. Adhesive is applied to the plies to join them together.

The strength of a paperboard tube depends on a number of factors, and there are several different strength properties one or more of which may be more important than others in a particular application. An important strength property that is assessed and taken into account in the design of paperboard tubes by the assignee of the present application, particularly with respect to paperboard winding cores, is the flat crush strength of the tube. In a flat crush test, the tube is loaded between two flat plates parallel to the axis of the tube. One plate is held stationary and the other plate is moved toward the stationary plate at a defined slow rate, and the load exerted on the tube is continuously monitored. The flat crush strength of the tube is the highest measured load before the tube is crushed.

Another significant strength property of a paperboard tube is the radial crush strength. Radially inward pressure loads can be exerted on tubes in some applications, such as when a web material is wound tightly about a paperboard winding core. Such winding cores must be able to withstand the expected radial crush loads without failing.

The beam bending strength of paperboard tubes can also be an important strength parameter. In the case of a winding core, for instance, the core is usually supported at its ends and the substantial weight of a roll of web material wound on the core must be tolerated without the core failing in bending.

The axial strength of a paperboard tube can also be an important strength parameter in some cases. Yet another important strength property of paperboard tubes in some applications is the tube's ability to withstand very high-speed rotation about its axis without failing as a result of radially outward centrifugal forces.

The various strength properties of a paperboard tube depend to a large extent on the strength properties of the paperboard plies making up the tube. In general, a paperboard tube of a given diameter and wall thickness can be increased in strength by making the tube from paperboard plies of a higher strength. Paperboard materials of various grades are commercially available. The grade of a paperboard is generally understood in the industry to correlate with the strength of the paperboard.

Laminated structures such as those described above tend to be limited in strength by the strength of the weakest link in the structure. In many laminated structures, the sheet material layers are weaker than the adhesive that binds them together. Where the structure is made up of layers of dissimilar materials, and hence different strengths, the factor limiting the strength of the structure therefore tends to be the strength of the weakest sheet material layer. Nevertheless, there may be good reasons to use such weaker layers in the structure, as opposed to using all strong layers. For example, as noted, in some cases there may be a cost advantage to using at least some weaker layers in the structure. In other cases, the weaker layer may serve another purpose that is needed and cannot be fulfilled by the other stronger layers; as an example, the weaker layer may be included because it serves as a needed fluid barrier while the other stronger layers do not. It would be advantageous to be able to reinforce such weaker layers to improve the strength of the laminated structure.

In some laminated structures constructed from layers of dissimilar materials, some layers may not be as readily bondable to the adhesive used for joining the layers together as other layers of the structure. As a result, the weak link in the structure may be the adhesive bond between such a less-bondable layer and its adjacent layer or layers. It would be desirable to be able to eliminate this weak link.

In other laminated paperboard structures, the chosen paperboard material for constructing the structure may be such that it does not bond to the adhesive as well as would be desired for optimal strength. For instance, paperboards that are densified to increase their strength sometimes tend to have poorer adhesive bonding than paperboards of lower density and strength. The strength benefit that such stronger plies provide thus can be partially offset by the lower adhesive bond strength between the plies. It would be desirable to remedy this situation.

SUMMARY OF THE INVENTION

The present invention addresses the above needs and achieves other advantages. A laminated structure in accordance with a first aspect of the invention comprises a plurality of sheet material layers joined together by an adhesive, the sheet material layers including at least one intermediate layer located other than on an outer surface of the laminated structure (i.e., located between other outwardly disposed layers). The intermediate layer preferably is formed of a material having a lower modulus or strength than that of the outwardly disposed layers. In a conventional laminated structure the anchoring of the outwardly disposed layers to each other occurs through the intermediate layer; thus, if the intermediate layer is weak, the overall strength of the structure is compromised. In accordance with the invention, however, the intermediate layer has a plurality of openings formed therein through which the adhesive penetrates so as to form adhesive bridges that extend through the intermediate layer and anchor the outwardly disposed layers to each other. Thus, the adhesive bridges reinforce the weaker intermediate layer and augment the anchoring of the outwardly disposed layers to each other.

The invention is applicable to various types of laminated structures. The sheet material layers can be formed of any suitable material, and can be rigid in some cases while in other cases they may be flexible.

In accordance with another aspect of the invention, the laminated structure comprises a paperboard structure constructed of a plurality of paperboard plies one or more of which is reinforced with the adhesive bridges. The paperboard plies can all be identical or can be of different paperboard materials. Preferably, the openings in the reinforced ply collectively have a total area making up about 2 to 25 percent of the surface area of the ply, more preferably about 5 to 20 percent of the ply surface area. Each opening can have an area from about 0.1 mm$^2$ to about 20 mm$^2$, more preferably about 1 mm$^2$ to about 15 mm$^2$.

Various sizes and shapes of openings can be formed through the ply or plies to be reinforced, such as circular holes, polygonal holes, slits, etc. In preferred embodiments of the invention, the openings comprise elongate slits (i.e., having a length dimension substantially greater than the width dimension) so that the perimeter of the opening is increased for a given opening area, or alternatively the opening area is reduced for a given perimeter. For instance, the openings can comprise rectangular holes having a length several times greater than the width. The openings preferably are oriented so that their length directions are substantially aligned with the direction along which the largest tensile loads are expected to be placed on the paperboard plies during a particular application. In this manner, the openings result in a relatively smaller reduction of the cross-sectional area of the ply that is available to support the tensile loads, compared to alternative orientations of the openings. It is further beneficial to stagger the openings in the lengthwise direction of a ply so as to limit the number of openings aligned along any given line extending in the widthwise direction of the ply; this also helps maximize the cross-sectional area of the ply available to support the tensile loads.

The openings in a ply or plies can be provided in various ways. The paperboard could be produced on a paper machine such that the paperboard comes off the machine having a substantial porosity or having small holes such that adhesive can penetrate through it. The openings alternatively can be made by pricking or puncturing a formed ply with a sharp tool or punch die.

Each ply having the openings preferably is disposed between two other plies, which may or may not have openings. Preferably, the plies forming the outer surfaces of the laminated structure do not have openings.

In some preferred embodiments, plies having openings are alternated with plies not having openings. In other embodiments, a plurality of contiguous plies each having openings can be incorporated in the laminated structure. Where two contiguous plies both have openings, it is considered preferable but not essential to stagger the openings so that the openings in one ply are not aligned with the openings in the adjacent ply.

The invention is applicable to multi-grade paperboard structures such as paperboard tubes. In particular, one or more lower-strength paperboard plies can be incorporated into a tube and can be reinforced by openings with adhesive bridges. Thus, multi-grade paperboard tubes formed of higher-strength and lower-strength paperboard plies can be improved in strength, relative to equivalent tubes not having openings through the lower-strength plies. In preferred embodiments of the invention, about 5 to 95 percent, more preferably about 30 to 70 percent, of the wall thickness of a multi-grade paperboard tube is made up of lower-strength paperboard plies, and some or all of the lower-strength plies have openings therethrough. The lower-strength plies having openings can be alternated with higher-strength plies, which may or may not have openings; alternatively, a plurality of contiguous lower-strength plies having openings can be included in the tube.

When a lower-strength ply is provided with openings and adhesive bridges are formed through the ply linking together stronger plies on either side of the weak ply, the resulting structure's strength is no longer limited by that of the weak ply, or at least is limited to a lesser extent than it otherwise would be.

The openings and adhesive bridges can also be advantageous in paperboard structures formed of densified high-strength plies, or formed with treated (e.g., saturated or coated) paperboard, which tend to bond with adhesive less tenaciously than may be desired. The adhesive bridges can be provided through the plies to form a continuous adhesive lacing or webbing to provide added strength to the ply interfaces.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
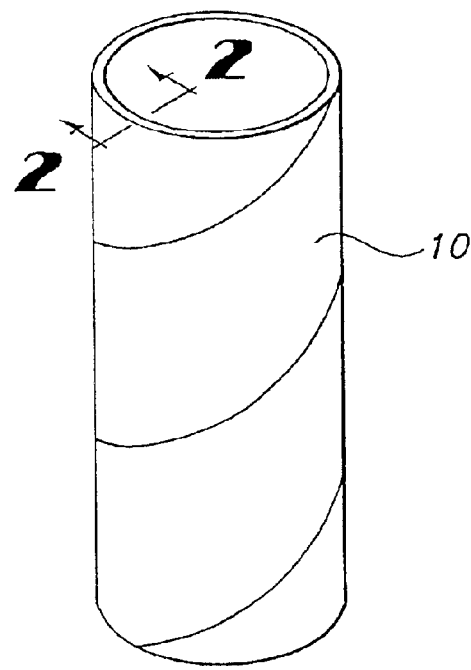
FIG. 1 is a perspective view of a paperboard tube in accordance with the invention.
Figure 2:
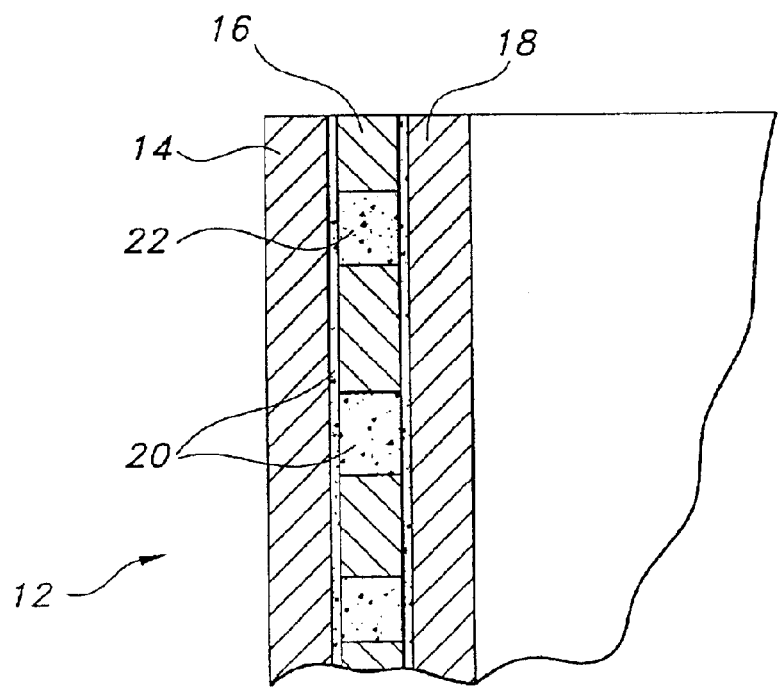
FIG. 2 is an enlarged cross-sectional view taken through the wall of the tube along line 2—2 in FIG. 1.

The present invention is applicable to various multi-layer paperboard structures formed by adhering multiple layers or plies of paperboard to one another. An example of such a product is a paperboard tube 10 as shown in FIG. 1. The tube 10 comprises a plurality of strips or plies of paperboard wrapped or wound one atop another about an axis and adhered together. In its simplest form in accordance with the invention, the tube 10 is formed of three plies. FIG. 2 shows a cross-section through the body wall 12 of such a three-ply tube. The body wall 12 comprises paperboard plies 14, 16, and 18. Adhesive 20 is applied between the opposing faces of the neighboring plies to adhere the plies together. In accordance with the invention, the intermediate ply 16 includes holes or openings 22 extending through it. Accordingly, when the adhesive 20 is applied to the plies in a fluid state, the adhesive intrudes into the openings 22. When the adhesive solidifies, substantially solid bridges of adhesive 20 extend through the openings 22, thus tying together the plies 14 and 18 on either side of the intermediate ply 16. In other words, a continuous adhesive connection is formed between the plies 14, 18.

Figure 3:
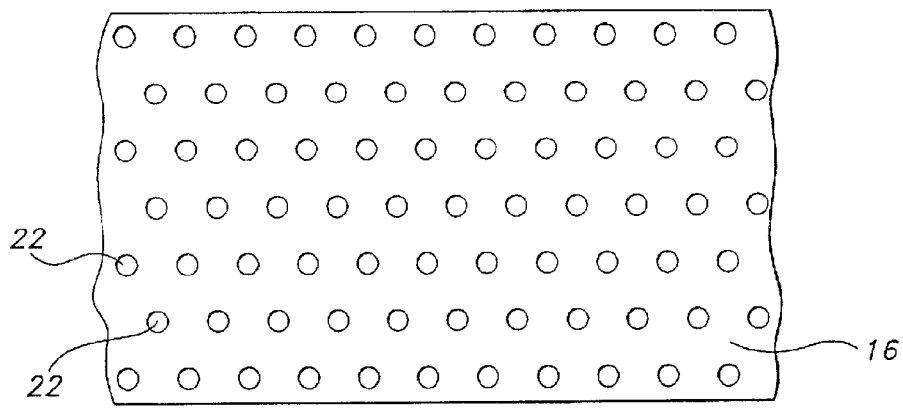
FIG. 3 is a plan view of a paperboard ply having openings therethrough in accordance with the invention.

FIG. 3 shows a plan view of the ply 16 having the openings 22. The openings 22 are spaced apart and distributed over the surface of the ply. Various shapes of openings 22 can be used in accordance with the invention. As shown, the ply 16 has punched circular openings 22, but other shapes can be used instead, including but not limited to polygonal holes, slits, etc. The openings can be formed in various ways, such as by punching, slitting, piercing, etc.

The sizes of the openings 22 and the spacing between them can be varied. Preferably, the openings 22 collectively have a total area that constitutes from about 2 to 25 percent of the surface area of the paperboard ply, and more preferably about 5 to 20 percent of the surface area. Each opening 22 preferably has an area from about 0.1 mm$^2$ to about 20 mm$^2$, more preferably about 1 mm$^2$ to about 15 mm$^2$. However, the invention in its broadest aspects is not limited to any particular sizes of openings, except that it should be noted that the openings in accordance with the invention are much larger than the microscopic pores that are inherently present in paperboard. Such pores do not allow adhesive to penetrate through them during a normal manufacturing process of a paperboard structure, whereas the openings in the paperboard ply formed in accordance with the invention do allow adhesive to readily penetrate through them to form adhesive bridges.

Figure 4:
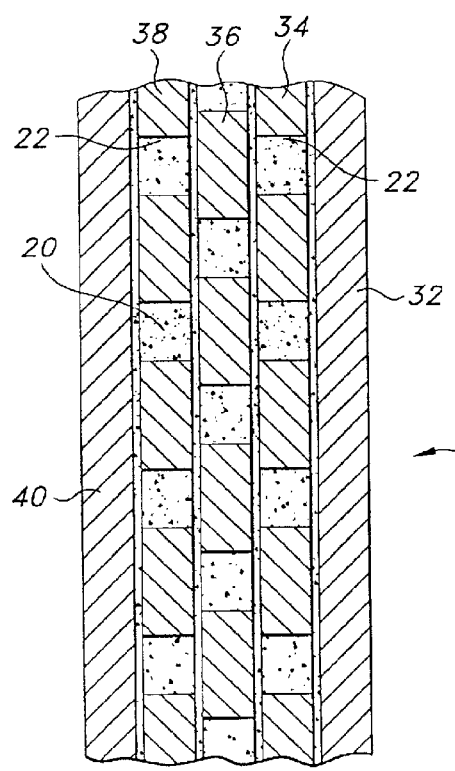
FIG. 4 is a view similar to FIG. 2, showing a five-ply paperboard structure in accordance with another embodiment of the invention.

An alternative paperboard structure 30 in accordance with the invention is depicted in FIG. 4. The structure 30 has five paperboard plies 32, 34, 36, 38, 40. Each of the three intermediate plies 34, 36, 38 includes openings 22 therethrough.

Figure 5:
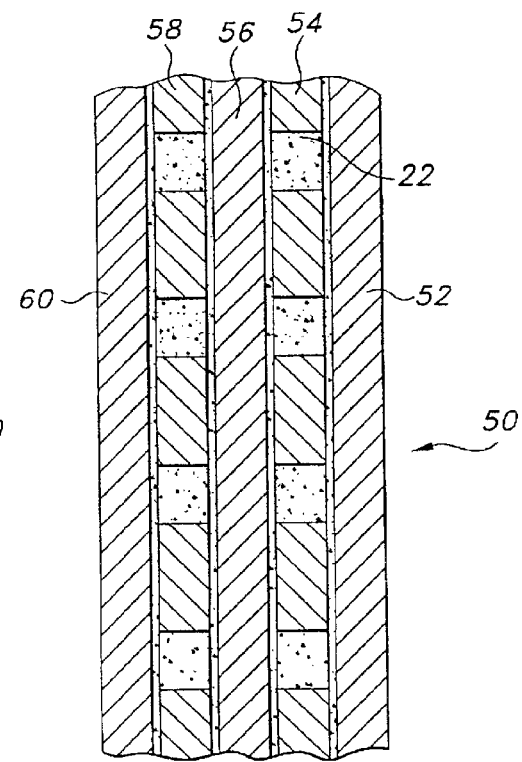
FIG. 5 shows another five-ply paperboard structure in accordance with yet another embodiment of the invention.

Yet another paperboard structure 50 in accordance with the invention is shown in FIG. 5. The structure 50 also has five paperboard plies 52, 54, 56, 58, 60. Alternate plies have openings; thus, the plies 54 and 58 have openings 22 but the remaining plies do not.

Structures such as those depicted in FIGS. 1–5 can be formed as multi-grade structures. Thus, for instance, in the structure of FIG. 2, the intermediate ply 16 having the openings 22 can be a relatively low-strength grade of paperboard while the two exterior plies 14, 18 can be formed of a relatively higher-strength grade of paperboard. The adhesive bridges extending through the openings 22 in the low-strength ply 16 can reinforce the ply so that it is no longer the weak link in the structure. Instead, the limiting factor determining the strength of the structure can be the higher-strength plies on either side of the low-strength ply.

A series of bench tests was performed on flat three-ply paperboard samples having the ordered construction H/L/H, where "H" signifies a ply of relatively higher grade and strength and "L" signifies a ply of relatively lower grade and strength. The higher-strength paperboard had a measured Scott Bond strength of 374 J/m$^2$. As known in the art, the Scott Bond test subjects a paperboard sample to impacts in a direction tending to peel or split the sample into two thicknesses; the test is a measure of the Z-direction (i.e., perpendicular to the plane of the sample) tensile strength of the sample.

Three different hole configurations were formed in the middle "L" plies: (1) no holes, (2) 3 mm diameter holes making up 8.8% of the surface area of the ply, and (3) 4 mm diameter holes making up 15.6% of the ply surface area. Thus, nine different sample configurations were made corresponding to the three different types of low-strength "L" plies and three different hole configurations. The plies were adhered together with dextrine adhesive. The samples were tested to determine their Scott bond strength. Three repeats were done for each sample configuration, for a total of 27 tests. The results of the tests are given in Table I below:

TABLE I

| L Ply | Hole Dia (mm) | Open Area % | Scott Bond Strength (J/m$^2$) | | | Average (J/m$^2$) | Increase % |
|---|---|---|---|---|---|---|---|
| | | | 1 | 2 | 3 | | |
| #1 | 0 | 0 | 221 | 242 | 242 | 235 | |
| | 3 | 8.8 | 347 | 336 | 357 | 347 | 47.8 |
| | 4 | 15.6 | 378 | 494 | 357 | 410 | 74.6 |
| #2 | 0 | 0 | 189 | 179 | 179 | 182 | |
| | 3 | 8.8 | 315 | 357 | 305 | 326 | 78.8 |
| | 4 | 15.6 | 441 | 452 | 399 | 431 | 136.5 |
| #3 | 0 | 0 | 231 | 252 | 242 | 242 | |
| | 3 | 8.8 | 368 | 357 | 441 | 389 | 60.9 |
| | 4 | 15.6 | 368 | 315 | 305 | 329 | 36.2 |

For comparison purposes, the Scott bond strength of the higher-strength paperboard was measured to be 374 J/m$^2$. Thus, it can be seen that with holes of 3 mm diameter, the average tested Scott bond strength of the samples having the #3 low-strength ply is very close to the Scott bond strength of the high-strength paperboard; without the holes, the strength is substantially lower than that of the high-strength paperboard. It is believed that without the holes, the strength of the sample is limited by the strength of the weak ply, which is the weak link where the sample fails in the test. With the holes providing adhesive bridges between the two strong plies, however, the weak ply is no longer the weak link in the structure. Accordingly, the strength of the structure ought to be closer to that of the strong plies. The test results in Table I support this notion.

Furthermore, with holes of 4 mm size, the average Scott bond strength of the samples made with #1 and #2 low-strength plies actually exceeded the strength of the high-strength paperboard alone. The strength of the samples made with the #3 low-strength paperboard was lower than that of the high-strength paperboard, but air bubbles were observed in the adhesive in the holes in those samples; the bubbles are believed to have compromised the effect of the adhesive bridges.

Thus, the test results show that the strength of a multi-grade paperboard structure can be significantly enhanced when the structure is constructed in accordance with the present invention.

To confirm the results of the first series of tests, and to further investigate other variables that may affect the performance of a multi-layer paperboard structure made in accordance with the invention, a second series of tests was performed. Samples of multi-layer paperboard structures were made in accordance with the following configurations designated "A" through "D":

A=H/L/H. Reference samples without openings, samples with 3 mm holes in the middle low-strength ply, and samples with 4 mm holes in the middle low-strength ply were made and tested.

B=H/$L_{0.5}$/$L_{0.5}$/H, where $L_{0.5}$ denotes a low-strength ply of 0.5 mm thickness. Reference samples without openings and samples with 3 mm holes in each of the middle low-strength plies were made and tested. The holes in the two middle plies were staggered to avoid superposition of the holes.

C=H/$L_{0.8}$/$L_{0.8}$/H (same as B, except the middle plies are low-strength plies of 0.8 mm thickness).

D=H/H/H. Reference samples without openings, samples with 3 mm holes in the middle low-strength ply, and samples with 4 mm holes in the middle low-strength ply were made and tested.

A Scott Bond was performed for each of configurations A through D, and the results are tabulated in Table II below:

TABLE II

| Configuration | Hole Dia (mm) | Open Area % | Scott Bond (J/m$^2$) | Increase % |
|---|---|---|---|---|
| A | 0 | 0 | 189 | |
|   | 3 | 8.8 | 290 | 53 |
|   | 4 | 15.6 | 399 | 111 |
| B | 0 | 0 | 280 | |
|   | 3 | 8.8 | 403 | 44 |
|   | 4 | 15.6 | 498 | 78 |
| C | 0 | 0 | 309 | |
|   | 3 | 8.8 | 445 | 44 |
|   | 4 | 15.6 | 595 | 92 |
| D | 0 | 0 | 511 | |
|   | 3 | 8.8 | 477 | -6.6 |
|   | 4 | 15.6 | 431 | -16 |

It can be seen that the construction of a paperboard structure in accordance with the invention substantially improved the Scott Bond strength. Increasing the hole diameter from 3 mm to 4 mm increased the Scott Bond strength.

The results of the testing of configurations B and C show that the invention offers advantages even when the low-strength plies having the openings are not located contiguously between two high-strength plies. In this case, the adhesive bridges through each low-strength ply are not made between two high-strength plies, but between one high-strength ply and one low-strength ply. The thickness of the low-strength plies in this type of structure does not seem to have a significant effect on the strength properties, as can be seen by comparing the test results of configuration B with those of configuration C in Table II.

During the course of the testing, it was observed that the adhesion between the adhesive bridges and the holes was mainly at the edges of the holes. Accordingly, it was hypothesized that the perimeter of each opening may be a more-significant factor than the total area of the opening, in terms of the impact on the strength properties of a resulting structure. If this hypothesis were true, a circle would be the worst shape of opening because it has the smallest perimeter for a given area. It would be preferable to use openings having a larger ratio of perimeter to area. This could also have advantages in terms of the total amount of adhesive added to the structure as a result of the openings. More specifically, for a given total amount of perimeter represented by the sum of all of the openings, the total area of the openings could be reduced through appropriate selection of the shapes of the openings, so that less adhesive is present in the openings. This would also have an advantage in terms of the moisture add-on caused by the adhesive in the openings.

To test this hypothesis, samples of the construction H/L/H having an alternative shape for the openings in the middle low-strength ply were made and tested for Scott Bond strength. The openings were rectangular slits having a length of 5 mm and a width of 1.4 mm, each slit thus having an area substantially equal to that of a 3 mm circular hole. The slit, however, had a perimeter of 12.8 mm, versus 9.4 mm for the circular hole. All samples had the same number of openings and hence same total open area; the slits provided a 36 percent larger total perimeter than the holes.

It was suspected that the orientation of the slits in relation to the direction of loading in the Scott Bond test might affect the results, so two different orientations were tested. One batch of samples had the slits oriented so that their lengthwise directions were parallel to the direction of movement of the Scott Bond pendulum (i.e., parallel to the direction of propagation of the break); another batch had the lengthwise directions of the slits perpendicular to the direction of movement of the Scott Bond pendulum (perpendicular to the direction of propagation of the break).

Yet another variable that was investigated is the amount of pressure applied to the plies to squeeze them together after application of the adhesive to the plies. Two different pressure levels were tested, 5 kPa and 10 kPa.

The results of the Scott Bond tests for this series are tabulated in Table III below:

TABLE III

| | Scott Bond Strength (J/m$^2$) | |
|---|---|---|
| Configuration | Pressure = 5 kPa | Pressure = 10 kPa |
| Reference (no openings) | 286 | 267 |
| 3 mm circular holes | 494 | 448 |
| 5 × 1.4 mm slits—parallel to loading direction | 555 | 464 |
| 5 × 1.4 mm slits—perpendicular to loading direction | 519 | 401 |

It will be noted that the slits provided a greater Scott Bond strength enhancement than the circular holes when the slits were oriented with their lengthwise directions parallel to the direction of propagation of the break. Accordingly, it should be possible to obtain the same Scott Bond strength as that attained with the circular holes, using slits having a smaller total area. This should result in a lower adhesive usage for a similar strength performance.

The test results also show that the samples pressed with a higher pressure to bond the plies together had a lower Scott Bond strength than the samples pressed with a lower pressure. It is theorized that the higher pressure reduced the volume of the adhesive available between the plies and in the open areas, and then drying of the adhesive caused shrinkage of the adhesive so that there may have been an inadequate amount to form adhesive bridges completely filling the open areas. Accordingly, it is believed that it may be advantageous to use an adhesive having a high solids content so as to reduce the shrinkage of the adhesive upon drying. The combination of smaller total open area provided by the slits and higher solids content of the adhesive should reduce the total moisture add-on by a significant amount.

In a multi-grade paperboard tube, it is theorized that the benefit of the openings in the low-strength plies noted in the above-summarized tests should be reflected in the strength of the tube; more particularly, a tube made in accordance with the invention should have an improved strength relative to an otherwise identical tube not having openings for forming adhesive bridges.

Various configurations of multi-grade tubes are possible in accordance with the invention. As shown in FIG. 5, for instance, a plurality of lower-strength plies can be included in a tube, each one having openings, and each being non-contiguous with the other lower-strength plies; alternatively, the tube can include contiguous low-strength plies having openings, as in the embodiment of FIG. 4. Although FIGS. 4 and 5 show five-ply structures, the invention is not limited to any particular number of plies, and paperboard tubes with as many as 25 or more plies can be made.

A multi-grade tube in accordance with the invention can include various numbers of high-strength and reinforced low-strength plies. As few as one low-strength ply can be included in a tube having from 3 to 25 or more plies, such that the reinforced low-strength ply may comprise as little as 5 percent of the total wall thickness of the tube. On the other hand, a majority of the plies in a tube having 5 or more plies can be low-strength plies reinforced in accordance with the invention, such that the low-strength plies may comprise as much as 95 percent of the body wall thickness. More commonly, however, it is expected that the low-strength plies will generally comprise from about 30 percent to 70 percent of the body wall thickness.

It should also be noted that although the foregoing description gives exemplary multi-grade tube constructions in which the lower-strength plies have the openings for forming adhesive bridges, it is also possible within the scope of the present invention to provide openings in higher-strength plies.

Figure 6:
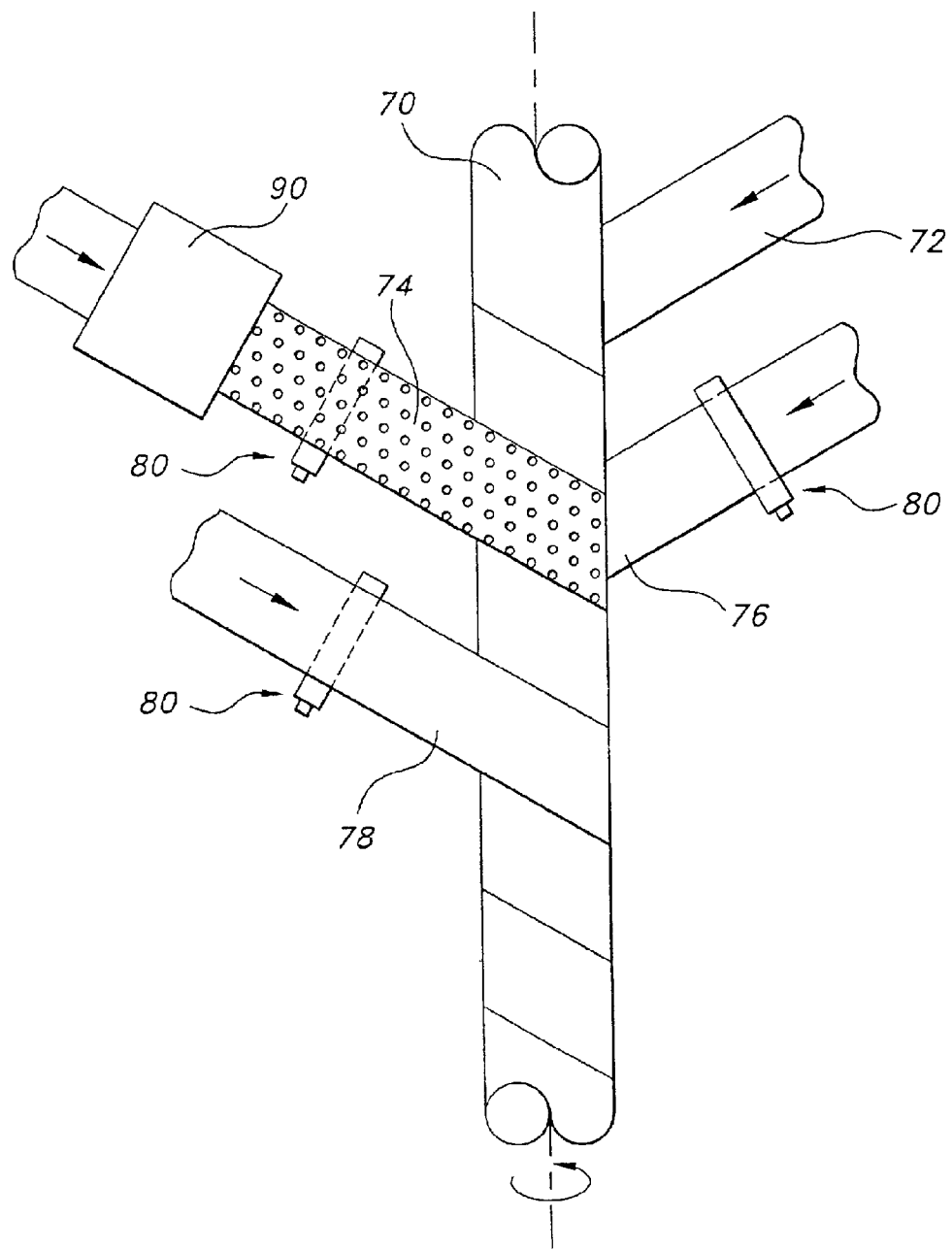
FIG. 6 is a schematic depiction of a paperboard tube being formed on a mandrel in accordance with the invention.

FIG. 6 depicts an apparatus for making a paperboard tube in accordance with the invention. The apparatus includes a cylindrical mandrel 70 on which the tube is formed. A plurality of paperboard plies 72, 74, 76, . . . 78 are drawn from supply rolls and advanced to the mandrel and are spirally wrapped onto the mandrel in overlapping arrangement with one another to form the tube. A winding belt (not shown) engages the paperboard tube on the mandrel and rotates the tube such that the tube advances along the mandrel in a screw fashion. The plies are secured together by adhesive applied to various ones of the plies by adhesive applicators 80. In accordance with the invention, one or more of the plies (in the illustrated embodiment, the ply 74) is provided with openings distributed over its surface. The ply 74 can be procured from a vendor with the openings already formed in it; alternatively, an in-line unit 90 can be provided for piercing, punching, or otherwise forming the openings in the ply drawn from its supply roll, as schematically illustrated in FIG. 6.

Figure 7:
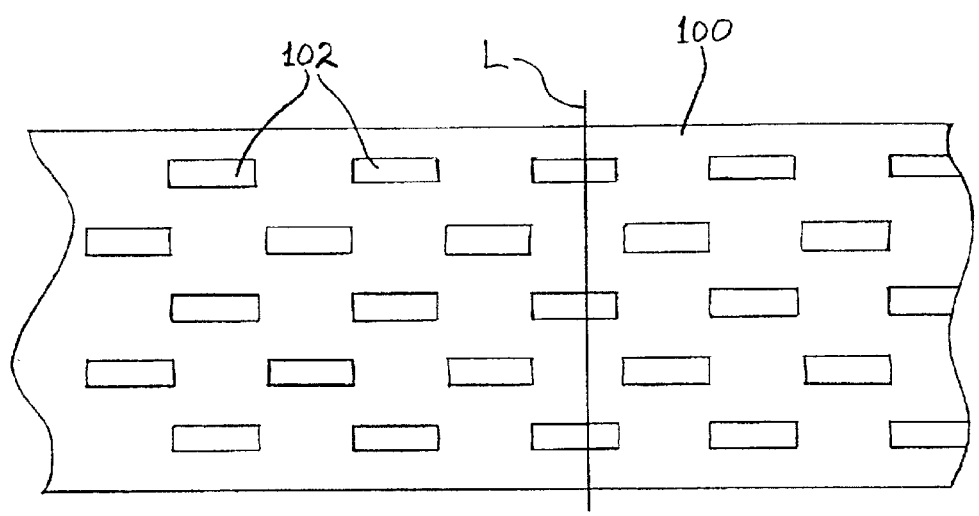
FIG. 7 is a plan view of a paperboard strip having an alternative configuration of openings formed as elongate slits.

Based on the tests summarized above, a preferred pattern of openings in a continuous paperboard strip used in forming spirally wound tubes is shown in FIG. 7. The paperboard strip 100 includes slits 102 arranged in five rows that extend in the lengthwise direction of the strip. The slits 102 are rectangular having a length dimension that substantially exceeds the width dimension. The length dimensions of the slits are preferably aligned along the lengthwise direction of the strip. Preferably, as shown, the slits are staggered so that any line perpendicular to the lengthwise direction of the strip, such as the illustrated line L, intersects fewer than five slits (i.e., fewer than the number of rows of slits). Thus, in the illustrated strip 100, the maximum number of slits 102 that can be intersected by a line perpendicular to the length of the strip is three, whereas there are five rows of slits. This results in less reduction of the cross-sectional area of the paperboard available to support tensile loads in the lengthwise direction of the strip. When the paperboard strip 100 is spirally wound during tube formation, the lengthwise directions of the slits 102 are aligned along the direction of spiral winding of the strip. Alternatively, the slits could be oriented with their lengthwise directions inclined to the lengthwise direction of the strip by an angle equal to the complement of the spiral wind angle at which the strip is wound when forming a tube. In this manner, the slits can be oriented axially along the tube. As yet another alternative, the slits can be inclined at the spiral wind angle so that the slits are oriented in the circumferential direction once the strip is wound onto the tube, or at any other desired angle.

Slits having shapes other than the illustrated rectangular slits can also be used in accordance with the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A paperboard tube, comprising:

a plurality of paperboard plies comprising continuous strips of paperboard wound in a spiral winding direction about an axis of the tube, the plies being wound one upon another and joined together by adhesive applied between opposing faces of the plies to form a paperboard tube structure, each ply having opposite edges, the plies including at least an interior paperboard ply proximate an inner surface of the tube structure, an exterior paperboard ply proximate an outer surface of the tube structure, and an intermediate paperboard ply positioned between the interior and exterior paperboard plies and having a plurality of elongate openings extending therethrough and spaced apart between the opposite edges of the ply, adhesive penetrating through the elongate openings so as to form adhesive bridges that extend through the intermediate paperboard ply and tie together paperboard plies on opposite sides thereof, wherein the elongate openings in the intermediate paperboard ply each has a lengthwise dimension substantially exceeding a widthwise dimension thereof, the elongate openings being oriented with the lengthwise dimensions substantially aligned along the spiral winding direction of the intermediate paperboard ply.

2. The paperboard tube of claim 1, wherein there are a plurality of intermediate paperboard plies each having openings with adhesive bridges extending therethrough.

3. The paperboard tube of claim 2, wherein all plies positioned between the interior and exterior paperboard plies have openings with adhesive bridges extending therethrough.

4. The paperboard tube of claim 1, wherein the intermediate paperboard ply has a lower strength than the interior and exterior paperboard plies.

5. The paperboard tube of claim 1, wherein the elongate openings in the intermediate paperboard ply collectively have a total area that comprises from about 2 percent to about 25 percent of the surface area of the intermediate paperboard ply.

6. The paperboard tube of claim 1, wherein the elongate openings are each about 0.1 mm$^2$ to 20 mm$^2$ in area.

7. The paperboard tube of claim 1, wherein the elongate openings are each about 1mm$^2$ to 15 mm$^2$ in area.

8. The paperboard tube of claim 1, wherein the paperboard tube comprises a winding core for winding web materials thereon.

\* \* \* \* \*